Jan. 30, 1968   G. CARP ET AL   3,366,933
HIGH FREQUENCY TRANSIENT RECORDER
Filed April 26, 1965   2 Sheets-Sheet 1

INVENTORS:
GERALD CARP,
RICHARD C. WEISCHEDEL,
BY
THEIR ATTORNEY.

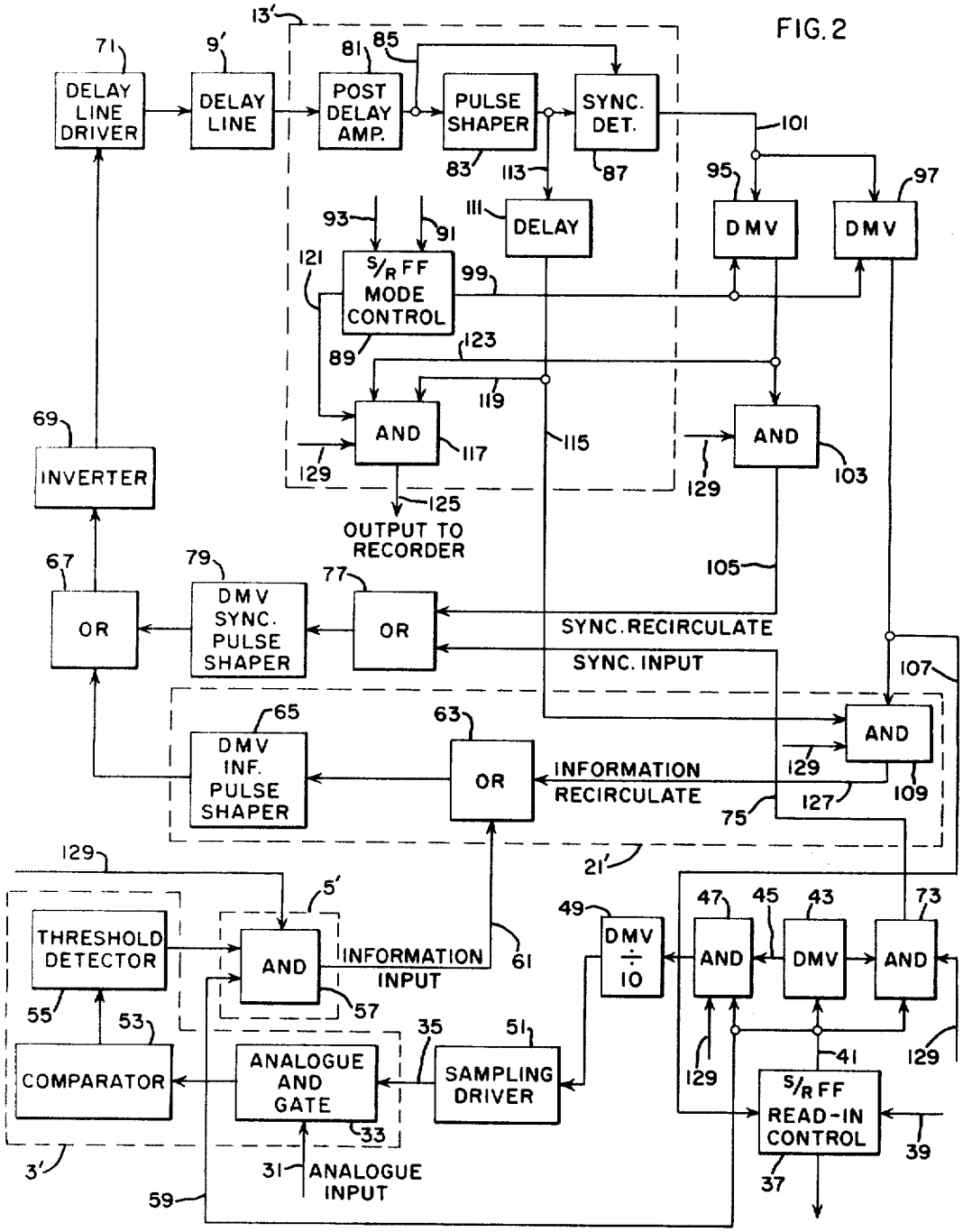

United States Patent Office 3,366,933
Patented Jan. 30, 1968

3,366,933
HIGH FREQUENCY TRANSIENT RECORDER
Gerald Carp and Richard C. Weischedel, Oklahoma City, Okla., assignors to General Electric Company, a corporation of New York
Filed Apr. 26, 1965, Ser. No. 450,951
7 Claims. (Cl. 340—172.5)

ABSTRACT OF THE DISCLOSURE

An arrangement is disclosed for recording a high frequency transient signal on a relatively low-frequency recorder. The transient signal is converted to digital data pulses by means of an analog-to-digital converter. The data pulses are fed into a recirculating delay-line circuit. A synchronizing pulse is fed into the recirculating delay-line circuit ahead of the first data pulse. An output gate feeds out, from the delay line to the low-frequency recorder, the data pulse which follows the synchronizing pulse. Means are provided to replace, in the recirculating delay line, this fed-out data pulse with a synchronizing pulse, so the next time around the next data pulse will be recorded. This procedure continues until all data pulses are recorded on the low-frequency recorder.

---

Figure 1:
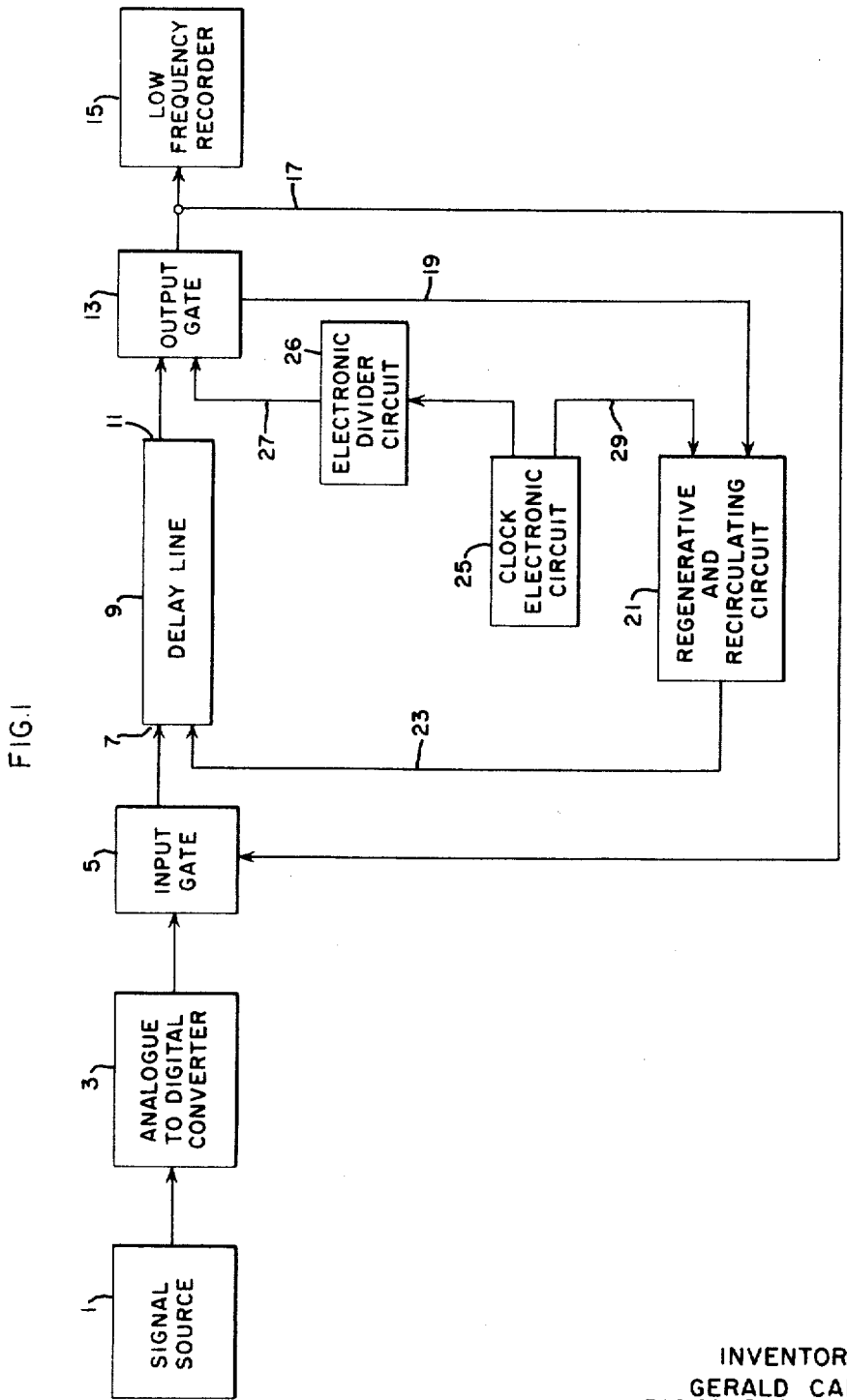

This invention relates generally to an arrangement for recording high frequency transient signals and, more particularly, to an arrangement which provides for the recordation of high frequency transients on a low frequency recorder.

In modern technology it is very often necessary to analyze and record for future reference very high frequency transient signals. Transient signals which have a relatively short duration or high frequency also have a large number of variations throughout the period of their duration. To obtain all the necessary information from such signals, it is required that the transient signal and its variations be accurately stored for future referral. The storage of extremely high frequency signals has presented many problems in connection with accurate recordation of the information. One of the problems is that these high frequency transient signals often occur in extremely adverse environmental conditions, such as in the vicinity of a nuclear detonation.

Prior art devices which have been utilized in an attempt to accurately record the transient signal have not been entirely successful. Oscilloscopes and cameras have had the disadvantages of high cost, large power consumption, limited amplitude range and a sensitivity to extreme environmental conditions such as magnetic fields and radiation. Magnetic tape recorders have had the disadvantages that the system has had to be large and complex to adequately record the very high frequencies, therefore resulting in high cost and bulkiness. The system of this invention has been developed to provide for the use of a low frequency magnetic tape recorder in the recordation of high frequency transient signals.

Therefore, it is a primary object of this invention to provide a high frequency recorder system in which much of the bulk and high cost of previous high frequency recordings is eliminated.

Another object of this invention is to provide a high frequency recorder which is not damaged by extremely adverse environmental conditions.

A further object of this invention is to provide a system using a low frequency magnetic tape recorder in the storing of high frequency transient signals.

Still another object of this invention is to provide a method for recording pulse information having relatively high sampling frequencies utilizing a low frequency recorder.

Briefly, in one form therof, this ivnetion makes use of a delay line and a recircuation process to permit the recordation of a high frequency transient signal on a low frequency magnetic tape recorder. A high frequency transient analogue signal is converted into digital pulses. The pulses are passed through a first gate to a delay line having a predetermined delay time and a specified pulse holding capability. The first data pulse appearing at the output of the delay line is passed through a second gate to a low frequency transient recorder. At the same time that the first pulse is being recorded, a signal is fed back to the first gate to prevent additional pulses from being passed into the delay line. After the first pulse is passed to the transient recorder, the second gate prevents the passage of succeeding pulses to the recorder and, instead, causes them to be returned to the input of the delay line through a recirculation circuit. The recirculation process continues with one data pulse being read out for each passage through the delay line until all of the pulses are stored in the recorder. Each of the pulses recorded in the transient recorder are separated from adjacent pulses by a time equal to the time delay of the delay line plus one pulse length or bit time.

In another aspect of the invention, additional reduction of the bandwidth required for the recorder may be achieved by the use of an electronic divider circuit. This electronic divider circuit provides for the recording of pulses after a plurality of recirculations, rather than after a single recirculation as in the basic system. Thus, the frequency requirements of the recorder are lowered even further.

The novel and distinctive features of this invention are set forth in the appended claims. The invention, together with further objects and advantages thereof, may be better understood by reference to the following description and accompanying drawings in which:

FIGURE 1 is a simplified schematic diagram of the basic arrangement of this invention; and FIGURE 2 is a more detailed schematic diagram of the system of FIGURE 1.

In FIGURE 1 there is shown in simplified block diagram form the basic system of this invention. The block 1 is generally designated as a signal source. Signal source 1 produces a high frequency transient voltage. The high frequency transient signal may come from any source and its waveform is indicative of information that is important enough to require analysis and storage. A particular example of the type of signal that may be produced by the source represented generally at 1, is a transient function associated with a nuclear detonation.

The analogue signal from signal source 1 is then sampled and converted to digital pulses in an analogue-to-digital converter 3. Sampling of the high frequency transient from source 1 occurs at a rate much greater than the frequency of the transient so that the resultant digital pulses have a frequency, or pulse rate, much higher than the frequency of the transient signal.

From analogue-to-digital converter 3, the digitized signal is passed to a first or input gate 5. The digital pulses appearing at gate 5, because they are information carrying pulses, may be more generally termed data pulses. Gate 5 passes these digital or data pulses to an input 7 of delay line 9. Delay line 9 is so chosen that it has a predetermined time delay dependent upon the particular use made of the high frequency recorder. In general, the time delay of delay line 9 should be approximately equal to the duration of the transient signal to be recorded. For example, if it is known that the duration of the transient signals coming from signal source 1 are in the range of 200 to 700 microseconds, a delay line having a delay time of 1 millisecond and a pulse capacity based upon the delay time and the sampling rate, would insure that a complete transient signal could be stored in delay line 9. Of course, this is only an example and there may be instances when it would be desired to store only a portion of the transient signal.

After a delay time determined by delay line 9, the series of pulses introduced at input 7 of delay line 9 will appear at the output 11 of the delay line. With the system in a READ-OUT mode of operation, the first of the pulses appearing at output 11 of delay line 9 is a sync pulse which causes the following pulse, a data pulse, to be passed through a second or output gate 13 to a low frequency transient recorder 15. The first data pulse is applied to recorder 15, and the sync pulse is fed back through line 17 to input gate 5. The pulse returned to gate 5 causes gate 5 to close, preventing the passage of any more pulses from converter 3 to delay line 9. Thus, the reading-in of additional pulses is prevented and the only pulses remaining in the circuit are those stored in the delay line when the first pulse is recorded in recorder 15.

A new sync pulse is placed in the position formerly occupied by the first data pulse. This together with the pulses after the first data pulse are passed by output gate 13 to a line 19 which connects the pulses to a regenerative and recirculating circuit 21. From regenerative and recirculating circuit 21 the pulses are returned on line 23 to input 7 of delay line 9. The entire train of pulses is then passed through delay line 9 again, and again the data pulse appearing at the output after the sync pulse is recorded on the recorder 15. A new sync pulse is inserted in the position of the recorded data pulse and together with the remainder of the data pulses are again recirculated, with a pulse being recorded in the low frequency recorder 15 after each recirculation. Ultimately, the entire train of pulses originally introduced to input 7 of delay line 9 is recorded on low frequency recorder 15, each pulse being spaced from each of the other pulses by a time equal to the delay time of delay line 9 plus one bit time.

If an even lower frequency or bandwith requirement is desired for recorder 15, an electronic divider circuit 26 may be utilized. Electronic divider circuit 26 applies control signals to output gate 13 on line 27. This control signal is utilized to control the recording of pulses in recorder 15. For a lower frequency of recording, electronic divider circuit 26 will provide control of the circuit so that a pulse will be recorded on every second, third or any higher number of recirculations, rather than upon every recirculation as is the case without the electronic divider control. Therefore, by further extending the time between pulses by a multiple, greater than one, of the delay time of delay line 9, the frequency and bandwidth requirements of recorder 15 may be further lowered.

In FIGURE 2 there is shown a more detailed illustration of the invention of FIGURE 1. FIGURE 2 is primarily a schematic diagram and will be hereinafter described in terms of the functions of the system components, all of which are well-known in the electronics art. In order to make the discussion more comprehensible, those portions of the invention which are equivalent to particular portions of the more generalized illustration of FIGURE 1 have been indicated with prime numerals. For instance, analogue-to-digital converter 3', input gate 5', delay line 9', output gate 13' and pulse regenerating and recirculating circuit 21' are so illustrated. An analogue signal to be recorded appears on input 31. The source of this signal is not shown, and as discussed in connection with the signal source 1 of FIGURE 1, the particular source of the analogue signal is not significant for purposes of this invention. This analogue signal is applied to an AND gate 33 in analogue-to-digital converter 3'.

In order to initiate sampling of the analogue signal appearing on input 31, an information sampling control signal is applied to gate 33 on line 35. This information sampling control signal is derived from a sampling or READ-IN control circuit 37. A start-sampling, or start READ-IN signal, is applied to control circuit 37 on input 39. This signal initiates action of a flip-flop in circuit 37 and produces an output on line 41. The output of control circuit 37 is applied to a delay multivibrator (DMV) 43 which produces output signals both to activate the information sampling control and to provide a sync (synchronization) signal.

An output of DMV 43, which is the basis of an information sampling control signal, is passed on line 45 to AND gate 47. AND gate 47 is also provided with the output signal from control circuit 37. AND gate 47 serves to pass the sampling control signal, since it produces a signal upon the occurrence of an output from control circuit 37 and the proper output from delay multivibrator 43. The AND or gate circuit 47 also serves as a timing reference point with the application of the system clock electronic circuits 25 and 26 on line 129. After passing through AND gate 47, the information sampling control signal is then applied to a divider circuit 49, which passes the control signal to a sampling driver circuit 51. The output of driver circuit 51 is the sampling control signal appearing on line 35, previously described.

As mentioned previously, analogue-to-digital converter circuit 3' includes AND gate 33 which permits sampling of the analogue signal appearing on input 31 when a sampling control signal occurs on line 35. The samplings of the analogue signal are then passed to a comparator 53. Comparator 53 and threshold detector 55 generate a variable width gate proportional to the amplitude of the sampled signal.

The variable width gate from converter circuit 3' is then passed to input gate 5'. Input gate 5' is primarily an AND circuit 57 which converts the variable width gate to digital data at a rate determined by the system clock signal on line 129. To insure that information is introduced into the delay line only when desired, the output signal from control circuit 37 is applied to AND gate 57. Thus, as long as control circuit 37 is in a READ-IN condition, the digital pulse information will be passed by gate 57 to the remainder of the system on line 61.

Digital pulse information from gate 57 is then passed to an OR circuit 63. From OR circuit 63 the information passes to a delay multivibrator and information pulse shaper circuit 65. The shaped information pulses from circuit 65 are then passed to another OR gate 67, and then to an inverter circuit 69. Inverted and shaped information pulses from circuit 69 are then conveyed to a delay line driver circuit 71, which may be a transistor amplifier. Amplified signals from the driver circuit 71 are then passed into delay line 9'.

The train of digital pulses introduced into delay line 9' is preceded by a sync pulse, which originated in the sampling control circuit 37. To provide sync pulses, the output of circuit 37 is applied to AND gate 73. AND gate 73 is also supplied with a signal from DMV 43. If both of these signals are present, a sync input pulse is provided on line 75. The sync input pulse is passed through an OR gate 77 to a delay multivibrator and sync pulse shaper 79. From the pulse shaper circuit 79, the sync pulse is passed to OR circuit 67. The circuit is arranged to have a sync pulse lead the information pulses so that detection of the sync pulse at the output guarantees that the beginning of the train of pulses is being detected.

As explained in connection with the discussions of FIGURE 1, the output of delay line 9' is passed to output gate 13'. The leading sync pulse and the information pulses from delay line 9' are passed into a post delay amplifier 81. Amplified pulses are then passed to a pulse shaper 83.

Simultaneously, the amplified sync and information pulses are passed on line 85 to a sync detector 87. The output pulses of pulse shaper 83 are also passed to sync detector 87.

A mode control circuit 89 determines whether the information pulses will be READ-OUT into a recorder (not shown) or will be held in the circuit. The particular mode will be chosen by either a HOLD signal appearing on lead 91, or a READ-OUT or record signal on line 93. If the mode control circuit 89 is in a READ-OUT or record mode, an appropriate signal will be fed to delay multivibrators 95 and 97 on line 99. This signal will place the DMV's 95 and 97 in a READ-OUT condition, so that if a sync signal is detected by circuit 87 and sent to DMV's 95 and 97 on line 101, these multivibrators will produce output pulses in proper time so that the first data pulse after the sync pulse will be entered in the recorder. The output of multivibrator 95 will be fed to an AND gate 103 to provide a recirculating sync signal which is then connected to OR gate 77 on line 105. Multivibrator 95 has a built-in delay to delay the sync pulse one bit interval so that upon recirculation the sync pulse will be in the position formerly occupied by the recorded data pulse. The output of delay multivibrator 97 will be passed to sampling control circuit 37 through line 107. This will switch the sampling control circuit to a stop READ-IN condition. This means that the sampling control pulses on line 35 and the sync input pulses on line 75 will be stopped, so that both the input sync and the input sampling signals will be prevented from being entered in the system. The output of the DMV 97 is also applied to AND gate 109 and the information recirculating circuit.

Referring back to the output of pulse shaper 83, the train of information pulses is passed to a delay circuit 111 on line 113. This delay is necessary to permit the provision of both a READ-OUT and a HOLD mode. The output of delay circuit 111 is then passed to AND gate 109 through the line 115. The output of delay 111 is also passed to an AND gate 117 through line 119. Still assuming that the mode control circuit 89 is in a READ-OUT or record mode, a signal is applied to AND gate 117 on line 121. Also, the output of delay multivibrator 95 is applied to AND gate 117 through line 123. Upon the occurrence of signals on lines 121 and 123, the first data pulse appearing on line 119 is passed through AND gate 117 to the recorder, as indicated by the output 125.

The data pulses, after the first data pulse, are passed through line 115 and AND gate 109 to be recirculated on line 127 to OR gate 63. It should be noted that regenerative and recirculating circuit 21' includes AND gate 109, OR gate 63 and pulse-shaping circuit 65. Circuit 21' also includes pulse shaper 83, but since that element has already been included in gate circuit 13' it is not shown in circuit 21' for the sake of simplicity. Since a sync signal has already been recirculated on line 105, the remaining pulses again pass through delay line 9' with a sync pulse leading the train. This process is continued until all of the data pulses are stored in the recorder with each pulse being separated from an adjacent pulse by time equal to the time delay of delay line 9' plus one bit time.

In summary, the operation of the circuit is as follows. When it is desired to store a signal, sampling control pulses are applied to converter circuit 3' on line 35 to digitize the analogue signal appearing at input 31. The output of converter 3' is then passed to an AND gate 57. The digitized signal is passed through gate 57 if the flip-flop in READ-IN control circuit 37 is in the proper position. The output of input gate 57 is then passed to OR gate 63. A train of information pulses will pass through OR gate 63, either from the input on line 61, or from the delay line on line 127 during recirculation. Similarly, a leading sync pulse is obtained for the train of information pulses either on line 75, if the information pulses are coming from the input, or on line 105 if the pulses are being recirculated. The train of pulses, with the sync pulses leading the train, are then passed to delay line 9' through a series of circuit elements.

There are two modes of operation for the circuit at the output of delay line 9', one being a READ-OUT mode in which a pulse is passed to a recorder, the other mode being a HOLD mode in which the pulses are recirculated through the system without being recorded. Assuming that the circuit is in the READ-OUT mode, the first information pulse is transferred to a recorder through line 119, AND gate 117 and output line 125. In this READ-OUT mode, the detected sync pulses on line 101 are applied to delay multivibrators 95 and 97. The output of DMV 95 produces a delayed sync pulse to be recirculated. The output of delay multivibrator 95 also provides a signal in the proper time relation to gate 117 on line 123 to permit the information pulses to be passed by AND gate 117 to output line 125.

The output of delay multivibrator 97 also performs two functions in the READ-OUT mode. In the first function, the output is applied to the READ-IN control circuit 37 through line 107 to stop the production of READ-IN pulses. This prevents the passage of a sync pulse through AND gate 73 and the passage of information pulses through AND gate 57, so that no new input signals are introduced into the system. The second function of the output of delay multivibrator 97 is to provide a signal in the proper time relation to AND gate 109 to permit recirculation of the information pulses on line 127.

Referring now to the HOLD mode, nearly the same operation occurs except that the output signal of delay multivibrator 95 has a time position such that the information pulses on line 119 will not be passed through gate 117, and the sync pulse will not be delayed. Otherwise the operation of the circuit is the same so that the train of pulses is merely recirculated through the system without being recorded.

As mentioned hereinbefore, a clock input signal is applied to AND gates 47, 57, 73, 103, 109 and 117 on the lines indicated as 129. The clock inputs on lines 129 permit further control of the digital information. For instance, the clock pulses may be utilized to recirculate the information several times before any information is fed out of the system into the recorder. This type of control permits the use of a recorder having an even lower frequency and bandwidth characteristic.

It should be realized that this description has been made with respect to one specific embodiment, but that it does not limit it to this embodiment or the particular uses described. It will be appreciated that modifications and changes may be made by those skilled in the art without departing from the spirit and scope of the invention. Thus, it is not desired to limit this invention to the particular construction shown and described, but to cover all modifications and changes within its spirit and scope by the appended claims.

What we claim as new and desire to secure by Letters Patent of the United States is:

1. A high frequency transient recorder system comprising: a delay line having an input and an output; a source of a high frequency transient signal; means for producing a series of data pulses representative of said high frequency transient signal; means for applying said data pulses to the input of said delay line; a low frequency recorder; means for connecting to said low frequency recorder the first data pulse to appear at the output of said delay line; and means for returning the rest of the data pulses to the input of said delay line, whereby the data pulses are continuously recirculated through the delay line until all are stored in said low frequency recorder, each data pulse being recorded at an interval of time equal to the delay of said delay line plus one bit time after the preceding pulse.

2. A high frequency transient recorder system comprising: a signal source producing a high frequency transient in analogue form; means for converting the high frequency transient analogue signal into a series of digital pulses; a delay line having an input and an output; a first gate connected to pass said digital pulses to the input of said delay line; a low frequency recorder; a second gate connected to pass the first digital pulse appearing at the output of said delay line to said low frequency recorder; means to terminate the passage of digital pulses through said first gate when said first pulse is passed to said low frequency recorder; a pulse recirculating circuit having an input and an output; said second gate connected to pass the digital pulses after said first pulse to the input of said recirculating circuit; and the output of said recirculating circuit connected to the input of said delay line, whereby the pulses after said first pulse are recirculated through said delay line until all of the pulses are stored in said low frequency recorder at a pulse time separation equal to the delay time of the delay line plus one bit time.

3. The high frequency transient recorder system as recited in claim 2 and further comprising: an electronic divider circuit connected to supply control signals to said second gate and said recirculating circuit, whereby the recirculation of said digital pulses is controlled so that said pulses are recirculated more than once before an additional pulse is recorded, thereby further reducing the frequency requirements of said low frequency recorder.

4. A high frequency transient recorder system comprising: a signal source producing a high frequency transient in analogue form; means for converting the high frequency transient analogue signal into a series of digital pulses; means for producing a sync pulse; means for placing said sync pulse in said circuit to precede said series of digital pulses; a delay line having an input and an output; a first gate connected to pass said sync pulse and said digital pulses to the input of said delay line; means connected to the output of said delay line to detect said sync pulse to ensure that the next pulse appearing at the output of the delay line will be the first pulse of said series of pulses; means for connecting said detected sync signal to said first gate to terminate the passage of digital pulses through said first gate; a low frequency recorder; a second gate connected to pass the first digital pulse appearing at the output of said delay line to said low frequency recorder; a digital pulse recirculating circuit having an input and an output; a sync pulse recirculating circuit having an input and an output; said second gate connected to pass the digital pulses after said pulse to the input of said digital pulse recirculating circuit and to pass said detected sync pulse to the input of said sync pulse recirculating circuit; means for delaying said sync pulse to replace the pulse just recorded in said series of pulses; and the output of said digital pulse recirculating circuit and the output of said sync pulse recirculating circuit connected to the input of said delay line, whereby the pulses after said first pulse are recirculated through said delay line until all of the digital pulses are stored in said low frequency recorder at a pulse time separation equal to the delay time of the delay line plus one bit time.

5. The high frequency transient recorder system as recited in claim 4 and further comprising: an electronic divider circuit connected to supply control signals to said second gate and said recirculating circuit, whereby the recirculation of said digital pulses is controlled so that said pulses are recirculated more than once before an additional pulse is recorded, thereby further reducing the frequency requirements of said low frequency recorder.

6. The high frequency transient recorder system as recited in claim 4 and further comprising: a mode control circuit to shift the high frequency transient recorder from a READ-OUT mode to a HOLD mode, whereby said series of digital pulses are recirculated through said circuit without being recorded until said mode control circuit is transferred back to the READ-OUT mode.

7. A recirculating delay line circuit for translating a series of pulses occurring at a relatively high repetitive rate to a series of pulses occurring at a relatively lower repetitive rate and comprising means for feeding said series of pulses occurring at a relatively high repetitive rate into said recirculating delay line circuit, wherein the improvement comprises means for feeding a synchronizing pulse into said recirculating delay line circuit ahead of a first pulse of said series, output means adapted to feed out from the delay line circuit the pulse next following said synchronizing pulse, and means for replacing said fed-out pulse with a synchronizing pulse, whereby pulses will be successively fed out from said recirculating delay line circuit during each recirculation cycle.

References Cited
UNITED STATES PATENTS

| | | | |
|---|---|---|---|
| 2,617,883 | 11/1956 | Anger | 333—20 |
| 2,747,797 | 5/1956 | Beaumont | 235—61 |
| 2,830,179 | 4/1958 | Stenning | 328—61 |
| 2,912,601 | 11/1959 | Slatten | 307—106 |
| 3,274,559 | 9/1966 | Giroux | 340—172.5 |

ROBERT C. BAILEY, *Primary Examiner.*

R. B. ZACHE, *Assistant Examiner.*